US010567501B2

(12) United States Patent
Lee et al.

(10) Patent No.: US 10,567,501 B2
(45) Date of Patent: *Feb. 18, 2020

(54) ENERGY MANAGEMENT SERVER, ENERGY MANAGEMENT SYSTEM AND THE METHOD FOR OPERATING THE SAME

(71) Applicant: LSIS CO., LTD., Anyang-si, Gyeonggi-do (KR)

(72) Inventors: Seok Chan Lee, Anyang-si (KR); Jong Kab Kwak, Anyang-si (KR); Tae Seop Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 259 days.

This patent is subject to a terminal disclaimer.

(21) Appl. No.: 15/472,147

(22) Filed: Mar. 28, 2017

(65) Prior Publication Data
US 2017/0289248 A1 Oct. 5, 2017

(30) Foreign Application Priority Data
Mar. 29, 2016 (KR) .................. 10-2016-0037628

(51) Int. Cl.
*H04L 29/08* (2006.01)
*G06Q 50/06* (2012.01)
*G06Q 10/06* (2012.01)
(52) U.S. Cl.
CPC ......... *H04L 67/1095* (2013.01); *G06Q 10/06* (2013.01); *G06Q 50/06* (2013.01)
(58) Field of Classification Search
CPC .... G06Q 10/06; G06Q 50/06; H04L 67/1095; H04L 43/0876; H04L 47/10; H04L 63/06;
(Continued)

(56) References Cited

U.S. PATENT DOCUMENTS 5,673,252 A * 9/1997 Johnson ................ G01D 4/004
                                                    370/346
5,781,910 A * 7/1998 Gostanian ............ G06F 11/202
                                                    707/610
(Continued)

FOREIGN PATENT DOCUMENTS

CN      102096684      6/2011
EP       2857994       4/2015
(Continued)

OTHER PUBLICATIONS

A Generic Synchronized Data Acquisition Solution for Distributed Automation Systems, by Florian Pethig, Bjorn Kroll and Oliver Niggemann, Alexander Maier, Tim Tack, Matthias Maag , 2012 IEEE 17th International Conference on Emerging Technologies & Factory Automation (ETFA 2012), IEEE Xplore:Mar. 28, 2013.*

(Continued)

*Primary Examiner* — Greg C Bengzon

(74) *Attorney, Agent, or Firm* — K&L Gates LLP

(57) ABSTRACT

An energy management server includes a controller configured to process first data collected from a power system into a second data; a memory database unit configured to classify the second data into dynamic data and static data according to an established data classification to store the dynamic and static data; and a duplex controller configured to selectively receive the first data and the dynamic data or the static data to synchronize with another energy management server.

9 Claims, 4 Drawing Sheets

(58) Field of Classification Search

CPC ....... H04L 63/062; H04L 63/10; H04L 67/10; H04L 67/1002; H04L 67/12; H04L 1/008; H04L 29/06578; G06F 11/2038; G06F 11/2097; G06F 13/4081; G06F 1/30; G06F 8/60; G06F 8/65; G06F 16/27; G06F 16/273; G06F 11/1451; G06F 11/1435; G06F 11/1456; G06F 11/1458; G06F 11/1469; G06F 11/1471; G06F 11/1658; G06F 11/2028; G06F 11/2041; G06F 11/2048; G06F 11/2094; G06F 16/214; G06F 16/23; G06F 16/2308; G06F 16/275; G06F 16/58; G06F 2201/84; G06F 11/2033; G06F 11/1687; G06F 11/2023; G06F 11/2025; G06F 11/2043; G06F 2221/2105; H02J 13/0006; H02J 13/001; H02J 13/0013; H02J 13/0062; H02J 13/0079; H02J 13/0086; G01R 19/2513; G05B 15/02; G05B 23/0221; G05B 19/0428; G05B 11/01; G05B 9/03; G05B 2219/34263; G05B 13/024; G05B 2219/24065; G05B 2219/24182; G05B 9/02; G05B 2219/12; G05B 2219/16; G05B 2219/163; G05B 2219/24125; G05B 2219/2609; G05B 2219/2612; G05B 2219/2619; G05B 2219/37532; G05B 2219/37533; G05B 2219/24053; G05F 1/66; G06N 20/00

See application file for complete search history.

(56) References Cited

U.S. PATENT DOCUMENTS

| | | | |
|---|---|---|---|
| 5,963,448 A * | 10/1999 | Flood | G06F 11/2097 700/19 |
| 6,141,664 A * | 10/2000 | Boothby | G06F 16/2308 |
| 6,415,418 B1 * | 7/2002 | McLaughlin | G05B 9/03 714/E11.08 |
| 6,421,688 B1 * | 7/2002 | Song | G06F 11/2025 |
| 6,587,970 B1 * | 7/2003 | Wang | G06F 11/2025 714/22 |
| 6,643,795 B1 * | 11/2003 | Sicola | G06F 11/2069 714/11 |
| 6,658,590 B1 * | 12/2003 | Sicola | G06F 11/1471 714/15 |
| 7,007,190 B1 * | 2/2006 | Kurapati | H04M 7/006 714/4.1 |
| 7,085,825 B1 * | 8/2006 | Pishevar | H04L 67/1095 709/204 |
| 7,149,742 B1 * | 12/2006 | Eastham | G06F 16/27 |
| 7,213,163 B2 * | 5/2007 | Dake | G06F 1/30 713/300 |
| 7,219,260 B1 * | 5/2007 | de Forest | G06F 11/1474 714/15 |
| 7,574,620 B2 * | 8/2009 | Hartung | G06F 9/5027 709/221 |
| 7,617,414 B2 * | 11/2009 | Becker | G06F 11/1456 714/15 |
| 8,352,481 B2 * | 1/2013 | Hattori | G06F 16/83 707/757 |
| 8,615,488 B2 * | 12/2013 | Akulavenkatavara | G06F 16/273 707/623 |
| 8,713,551 B2 * | 4/2014 | Douglas | G06F 11/2097 714/12 |
| 8,751,432 B2 * | 6/2014 | Berg-Sonne | G05B 15/02 706/48 |
| 8,856,077 B1 * | 10/2014 | Roth | H04L 67/1095 707/638 |
| 8,880,477 B2 * | 11/2014 | Barker | G06F 9/5088 707/649 |
| 8,996,666 B2 * | 3/2015 | Vasseur | H04L 47/10 709/220 |
| 9,057,746 B1 * | 6/2015 | Houlette | G06Q 50/06 |
| 9,172,623 B1 * | 10/2015 | Micali | H04L 67/12 |
| 9,251,003 B1 * | 2/2016 | Gupta | G06F 11/1469 |
| 9,274,903 B1 * | 3/2016 | Garlapati | G06F 11/2002 |
| 9,400,720 B2 * | 7/2016 | Sathyanarayana | G06F 11/1658 |
| 9,613,120 B1 * | 4/2017 | Kharatishvili | G06F 16/2358 |
| 9,639,589 B1 * | 5/2017 | Theimer | G06F 11/14 |
| 9,710,168 B2 * | 7/2017 | Motonaga | G06F 3/0679 |
| 9,779,016 B1 * | 10/2017 | Shen | G06F 1/30 |
| 9,785,505 B1 * | 10/2017 | Narzisi | G06F 11/1451 |
| 9,874,923 B1 * | 1/2018 | Brown | H04W 4/70 |
| 9,880,753 B2 * | 1/2018 | Sawicki | G06F 3/0607 |
| 9,940,377 B1 * | 4/2018 | Sait | H04L 67/1097 |
| 9,983,555 B2 * | 5/2018 | Bengtson | G05B 9/02 |
| 10,025,673 B1 * | 7/2018 | Maccanti | G06F 11/1466 |
| 10,069,914 B1 * | 9/2018 | Smith | H04L 63/0428 |
| 2001/0037326 A1 * | 11/2001 | Bamford | G06F 11/1471 |
| 2003/0105988 A1 * | 6/2003 | Shanbhogue | G06F 8/65 714/6.3 |
| 2004/0162642 A1 * | 8/2004 | Gasper | H02J 13/001 13/1 |
| 2005/0028024 A1 * | 2/2005 | Kataoka | G06F 11/2038 714/4.1 |
| 2005/0033481 A1 * | 2/2005 | Budhraja | H02J 3/008 700/286 |
| 2005/0138081 A1 * | 6/2005 | Alshab | G06Q 10/06 |
| 2006/0053121 A1 * | 3/2006 | Zizys | G06F 11/1451 |
| 2006/0053304 A1 * | 3/2006 | Fries | G06F 11/1451 713/189 |
| 2006/0056285 A1 * | 3/2006 | Krajewski, III | G05B 9/03 370/216 |
| 2006/0069946 A1 * | 3/2006 | Krajewski, III | G06F 11/1658 714/4.1 |
| 2006/0211404 A1 * | 9/2006 | Cromp | G06Q 10/06 455/405 |
| 2006/0224775 A1 * | 10/2006 | Lee | H04L 63/062 709/248 |
| 2006/0242370 A1 * | 10/2006 | Suzuki | G06F 11/1402 711/162 |
| 2007/0168704 A1 * | 7/2007 | Connolly | G06F 11/2025 714/6.1 |
| 2007/0183224 A1 * | 8/2007 | Erofeev | G06F 11/1456 365/189.05 |
| 2007/0185937 A1 * | 8/2007 | Prahlad | G06F 16/184 |
| 2007/0185938 A1 * | 8/2007 | Prahlad | G06F 16/2365 |
| 2007/0186068 A1 * | 8/2007 | Agrawal | G06F 11/1456 711/162 |
| 2007/0198700 A1 * | 8/2007 | Vivian | G06F 11/2097 709/224 |
| 2007/0233828 A1 * | 10/2007 | Gilbert | G06F 11/1458 709/223 |
| 2007/0255854 A1 * | 11/2007 | Khosravy | H04L 67/1095 709/248 |
| 2008/0126846 A1 * | 5/2008 | Vivian | G06F 11/1482 714/6.12 |
| 2008/0126853 A1 * | 5/2008 | Callaway | G06F 11/1641 714/13 |
| 2008/0130812 A1 * | 6/2008 | Eom | G06F 16/273 375/359 |
| 2008/0178025 A1 * | 7/2008 | Hand | G06F 3/0607 713/323 |
| 2008/0221856 A1 * | 9/2008 | Dubnicki | G06F 3/0608 703/21 |
| 2008/0262820 A1 * | 10/2008 | Nasle | G06Q 10/04 703/18 |
| 2009/0006499 A1 * | 1/2009 | Mukhi | G06F 16/275 |
| 2009/0006888 A1 * | 1/2009 | Bernhard | G06F 11/08 714/6.12 |
| 2009/0313311 A1 * | 12/2009 | Hoffmann | G06F 11/2094 |
| 2010/0161551 A1 * | 6/2010 | Whynot | G06F 11/2094 707/610 |

(56) References Cited

U.S. PATENT DOCUMENTS

| | | | |
|---|---|---|---|
| 2010/0257140 A1* | 10/2010 | Davis | G06F 16/113 707/661 |
| 2010/0274407 A1* | 10/2010 | Creed | H02J 3/14 700/295 |
| 2010/0280673 A1* | 11/2010 | Woste | G05B 19/0428 700/287 |
| 2011/0022879 A1* | 1/2011 | Chavda | G06F 11/0793 714/1 |
| 2011/0058440 A1* | 3/2011 | Smith | G11C 5/141 365/229 |
| 2011/0060722 A1* | 3/2011 | Li | G06F 11/2038 707/649 |
| 2011/0066595 A1* | 3/2011 | Kreuder | G06F 16/27 707/634 |
| 2011/0153969 A1* | 6/2011 | Petrick | G06F 21/606 711/163 |
| 2011/0173619 A1* | 7/2011 | Fish | G06F 16/2365 718/101 |
| 2012/0005542 A1* | 1/2012 | Petersen | G06F 11/0709 714/48 |
| 2012/0084400 A1* | 4/2012 | Almadi | H04L 41/069 709/219 |
| 2012/0089523 A1* | 4/2012 | Hurri | G06Q 10/10 705/304 |
| 2012/0124431 A1* | 5/2012 | Bauer | H04L 41/0663 714/55 |
| 2012/0151118 A1* | 6/2012 | Flynn | G06F 11/1008 711/6 |
| 2012/0151272 A1* | 6/2012 | Behrendt | G06F 9/542 714/39 |
| 2012/0158327 A1* | 6/2012 | Hurri | G06Q 50/06 702/62 |
| 2012/0158328 A1* | 6/2012 | Hurri | G06Q 50/06 702/62 |
| 2012/0158329 A1* | 6/2012 | Hurri | G06Q 50/06 702/62 |
| 2012/0253881 A1* | 10/2012 | Schneider | G06Q 10/06 705/7.28 |
| 2012/0310559 A1* | 12/2012 | Taft | H02J 13/0013 702/62 |
| 2012/0323849 A1* | 12/2012 | Garin, Jr. | G06F 16/27 707/617 |
| 2013/0031037 A1* | 1/2013 | Brandt | H04L 63/1408 706/12 |
| 2013/0067181 A1* | 3/2013 | Boldyrev | G06F 11/1458 711/162 |
| 2013/0097458 A1* | 4/2013 | Sekino | G06F 11/1441 714/6.3 |
| 2013/0124001 A1* | 5/2013 | Bhageria | H02J 13/0006 700/296 |
| 2013/0158681 A1* | 6/2013 | Hamm | G05B 19/0428 700/79 |
| 2013/0185716 A1* | 7/2013 | Yin | G06F 9/45558 718/1 |
| 2013/0198133 A1* | 8/2013 | Lee | G06F 16/00 707/611 |
| 2013/0218349 A1* | 8/2013 | Coogan | G05B 13/02 700/275 |
| 2013/0262396 A1* | 10/2013 | Kripalani | G06F 11/1456 707/674 |
| 2013/0282976 A1* | 10/2013 | Dubnicki | G06F 12/00 711/112 |
| 2013/0310952 A1* | 11/2013 | Matsuda | G05B 11/01 700/9 |
| 2014/0040206 A1* | 2/2014 | Ramakrishnan | G06F 11/2097 707/640 |
| 2014/0081916 A1* | 3/2014 | McAlister | G06F 11/2025 707/634 |
| 2014/0258241 A1* | 9/2014 | Chen | G06F 16/2365 707/683 |
| 2014/0277788 A1* | 9/2014 | Forbes, Jr. | G05B 13/02 700/286 |
| 2014/0279920 A1* | 9/2014 | Madhavarapu | G06F 11/1458 707/649 |
| 2014/0279930 A1* | 9/2014 | Gupta | G06F 11/1464 707/683 |
| 2014/0279931 A1* | 9/2014 | Gupta | G06F 16/27 707/683 |
| 2014/0297588 A1* | 10/2014 | Babashetty | G06F 11/1458 707/613 |
| 2014/0304230 A1* | 10/2014 | Simon | G06F 16/27 707/634 |
| 2014/0310556 A1* | 10/2014 | Agetsuma | G06F 13/00 714/6.12 |
| 2014/0336795 A1* | 11/2014 | Asenjo | G05B 19/4083 700/86 |
| 2015/0012495 A1* | 1/2015 | Prahlad | G06F 3/0649 707/640 |
| 2015/0045915 A1* | 2/2015 | Schmidt | G05B 19/048 700/79 |
| 2015/0051749 A1* | 2/2015 | Hancock | G06Q 50/06 700/295 |
| 2015/0058449 A1* | 2/2015 | Garg | H04L 67/10 709/219 |
| 2015/0074061 A1* | 3/2015 | Yoon | G06F 16/13 707/654 |
| 2015/0115711 A1* | 4/2015 | Kouroussis | H02J 9/061 307/23 |
| 2015/0143468 A1* | 5/2015 | Hebert | H04L 63/10 726/4 |
| 2015/0177767 A1* | 6/2015 | Lee | G06Q 50/06 700/286 |
| 2015/0278024 A1* | 10/2015 | Barman | G06F 16/24578 707/634 |
| 2015/0309556 A1* | 10/2015 | Kwak | G05B 19/41885 713/340 |
| 2015/0317221 A1* | 11/2015 | Sampath | H04L 41/145 714/4.11 |
| 2015/0347548 A1* | 12/2015 | Mortensen | G06F 16/27 707/618 |
| 2016/0011617 A1* | 1/2016 | Liu | G05B 15/02 700/287 |
| 2016/0036623 A1* | 2/2016 | Clarkson | H04L 41/0668 714/4.11 |
| 2016/0048408 A1* | 2/2016 | Madhu | G06F 11/1458 718/1 |
| 2016/0056905 A1* | 2/2016 | Hartlmueller | H04L 12/40032 375/354 |
| 2016/0132400 A1* | 5/2016 | Pawar | G06F 11/14 707/679 |
| 2016/0132409 A1* | 5/2016 | Chinnakkonda Vidyapoornachary | G06F 11/2058 714/6.23 |
| 2016/0209059 A1* | 7/2016 | Castillo | G05B 15/02 |
| 2016/0259589 A1* | 9/2016 | Zettsu | G06F 3/0634 |
| 2016/0274558 A1* | 9/2016 | Strohmenger | G05B 19/0428 |
| 2016/0274974 A1* | 9/2016 | Chen | G06F 11/1451 |
| 2016/0291959 A1* | 10/2016 | Searle | H04L 41/082 |
| 2016/0314046 A1* | 10/2016 | Kumarasamy | G06F 11/1435 |
| 2017/0006135 A1* | 1/2017 | Siebel | H04L 67/02 |
| 2017/0031426 A1* | 2/2017 | Kim | G06Q 10/06 |
| 2017/0046458 A1* | 2/2017 | Meagher | G06F 17/5009 |
| 2017/0289248 A1* | 10/2017 | Lee | H04L 67/1095 |
| 2017/0302218 A1* | 10/2017 | Janik | B63J 3/00 |
| 2017/0357252 A1* | 12/2017 | Nausley | G05B 23/02 |
| 2018/0046926 A1* | 2/2018 | Achin | G06N 5/02 |
| 2018/0330293 A1* | 11/2018 | Kulkarni | G06Q 10/0633 |

FOREIGN PATENT DOCUMENTS

| | | |
|---|---|---|
| EP | 2887303 | 6/2015 |
| GB | 2359385 | 8/2001 |
| JP | 2014187422 | 10/2005 |
| JP | 2013158081 | 8/2013 |
| KR | 20090029404 A | 3/2009 |
| KR | 1020150041262 | 4/2015 |

(56) References Cited

FOREIGN PATENT DOCUMENTS

| | | |
|---|---|---|
| KR | 1020150072162 | 6/2015 |
| KR | 1536410 B1 | 7/2015 |
| KR | 1020150128267 | 11/2015 |

OTHER PUBLICATIONS

Korean Intellectual Property Office Application No. 10-2016-0037628, Office Acation dated Oct. 11, 2016, 6 pages.
European Patent Office Application Serial No. 17159593.7, Search Report dated May 31, 2017, 6 pages.

* cited by examiner

ENERGY MANAGEMENT SERVER, ENERGY MANAGEMENT SYSTEM AND THE METHOD FOR OPERATING THE SAME

CROSS-REFERENCE TO RELATED APPLICATIONS

Pursuant to 35 U.S.C. § 119(a), this application claims the benefit of earlier filing date and right of priority to Korean Patent Application No. 10-2016-0037628, filed on Mar. 29, 2016, the contents of which are hereby incorporated by reference in its entirety.

BACKGROUND

Power system refers to a system in which a power plant, a substation, a power and distribution line and a load are integrated to generate and use power. In such generation and use of power, there are highly increased interests in saving energy consumption and improving its efficiency due to the strengthened government regulation to improve energy efficiency and reduce greenhouse gas emissions, increased energy cost burden, and insufficient power supply.

While energy conservation should be implemented continuously and validly and a practice tool is needed, a satisfied means has not been suggested until now.

Energy conservation should be a powerful means to understand where and how much energy is used and find out waste factors and improvement plan so as to practice them.

As such a means, an energy management system (EMS) is spotlighted worldwide, which provides a monitoring function and a control function of energy flow.

The energy management system is an integrated energy management solution to monitor energy usage in real time on the basis of hardware, software and ICT based monitoring and control technology and analyze aggregated data, optimizing energy usage.

A duplex system for an energy management solution provides a duplexing function of a server in an active system and a standby system in order to provide continuous services in preparation for a fault of server, equipment and software.

The active system performs operations such as server, equipment and software, and the stand-by system performs a backup, which substitutes for the active system when it is in trouble.

In a duplex system, when data inputted in a field and by a user are rapidly increased, there may occur an error, such as data omission in a data synchronization process.

SUMMARY

According to an aspect of the present invention, there is provided an energy management server, including a controller configured to process first data collected from a power system into a second data; a memory database unit configured to classify the second data into dynamic data and static data according to an established data classification to store the dynamic and static data; and a duplex controller configured to selectively receive the first data and the dynamic data or the static data to synchronize with another energy management server.

Preferably, the memory database unit may classify and store the dynamic data changing at an interval of a predetermined period in the power system, and the static data determined when designing the power system, among the second data.

Preferably, the duplex controller may synchronize the first data with another energy management server in real time, when the first data includes specific event data.

Preferably, the duplex controller may perform a data consistency between the first data and the dynamic data to synchronize with another energy management server.

Preferably, the energy management server according to the present disclosure may further comprise a database configured to store at least one of the first and second data.

According to another aspect of the present invention, there is provided an energy management system, including a first energy management server; and a second energy management server configured to process first data collected from a power system into second data, and selectively synchronize with the first energy management server dynamic data or static data produced by classifying the first data and the second data according to an established data classification.

Preferably, the second energy management server may include a controller configured to process the first data into the second data; a memory database unit configured to classify the second data into the dynamic data and the static data according to an established data classification to store the dynamic and static data; and a duplex controller configured to selectively receive the first data and the dynamic data or the static data to synchronize with another energy management server.

Preferably, the memory database unit may classify the dynamic data changing at an interval of a predetermined period in the power system, and the static data determined when designing the power system, among the second data.

Preferably, the duplex controller may receive the dynamic data stored in the memory database unit.

Preferably, the duplex controller may perform a data consistency between the first data and the dynamic data transmitted from the controller to perform a data and visual synchronization with another energy management server.

Preferably, the duplex controller may synchronize the first data with another energy management server in real time when the first data includes specific event data.

Preferably, the duplex controller may perform a data consistency between the first data and the dynamic data to synchronize with another energy management server.

Preferably, the energy management system according to the present disclosure may further comprise a database configured to store at least one of the first and second data.

Preferably, the first energy management server may include a construction corresponding to the duplex controller included in the second energy management server.

Preferably, the energy management system according to the present disclosure may further comprise an external controller that converts operation states of the first and second energy management servers, wherein the external controller may control the first energy management server to operate in an enable state, when a fault occurs in the second energy management server.

According to yet another aspect of the present invention, there is provided a method for operating an energy management system, including allowing a second energy management server in an enable state to process first data collected from a power system into second data; allowing the second energy management server to classify the second data into dynamic data and static data according to an established data classification; and selectively synchronizing the first data and the dynamic data or the static data with the first energy management server in a standby state.

Preferably, the synchronizing to the first energy management server may be performed by making a data consistency between the first data and the dynamic data or the static data to synchronize with the first energy management server.

A duplex controller of an energy management server according to the present disclosure may directly receive first data so that it may rapidly duplex another energy management server.

Further, since the duplex controller may receive the first data in real time and selectively receive data needed to make duplexing among the second data, so that it may perform a consistency between data and, by doing this, increase reliability of data duplexing.

Further, the energy management system may process specific event data in real time so that a problem occurred by change of the power system is solved and energy efficiency may be increased, whereby there is an economic advantage.

DETAILED DESCRIPTION OF THE EMBODIMENTS

Figure 1:
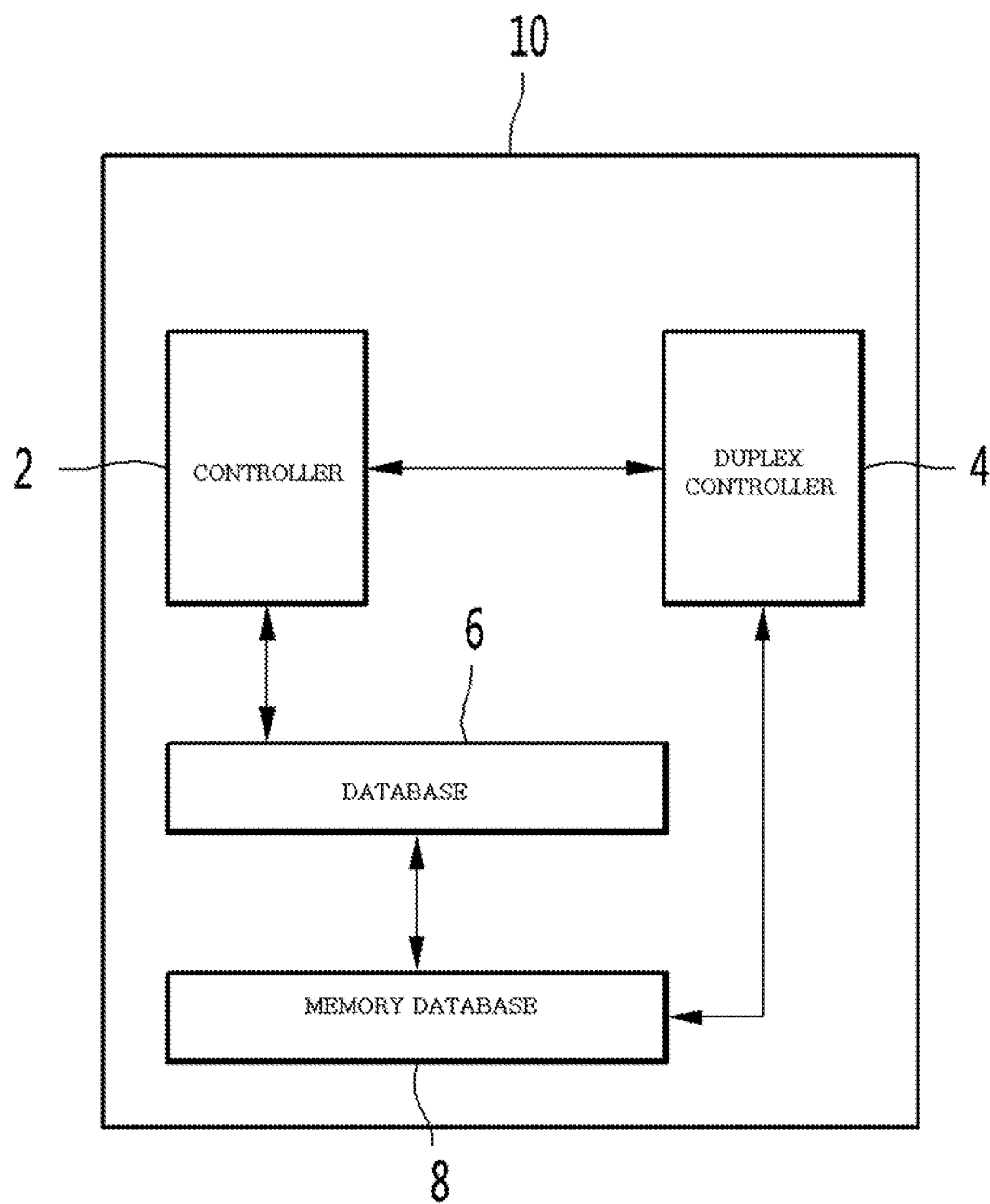
FIG. 1 is a block configuration view illustrating an energy management server to which an embodiment of the present disclosure is applied.

FIG. 1 is a block configuration view illustrating an energy management server to which an embodiment of the present disclosure is applied.

Referring to FIG. 1, an energy management server 10 to which an embodiment of the present disclosure is applied may include a controller 2, a database 6, a memory database 8 and a duplex controller 4.

The energy management server 10 may receive data from a power collection device (not shown) included in a power system and store the data in the database 6. Also, the energy management server 10 may provide a client with the stored database 6.

The energy management server 10 may manage and control a power system, and may be connected to a plurality of clients. Also, the energy management server 10 may have a duplex structure.

The controller 2 may control the entire operations of the energy management server 10.

The controller 2 may generate the database 6 with a first collected from the power system and a second data produced by processing the first data.

The controller 2 may receive data converted in real time such as voltage, current, power and load, data of initially designing the power system, and data maintained until a user controls an input value. Also, the controller 2 may process input data to generate the database 6.

The first data may be data converted in real time such as voltage, current, power and load, data of initially designing the power system and data maintained until they are controlled by a user input value.

The second data may be data produced by processing the first data, and data produced by processing data converted in real time such as voltage, current, power and load. Also, the second data may be data produced by processing data when initially designing the power system, or data produced by processing data that are maintained until they are controlled by a user input value.

The memory database 8 may separate the second data stored in the database 6 according to a data classification to store them.

The memory database 8 may separate the second data into data converted in real time such as voltage, current, power and load in the power system, data when initially designing the power system and data that are maintained until a user controls an input value and store them.

The duplex controller 4 may selectively receive data stored in the memory database 8 to synchronize them with another energy management server 10.

As a preferred embodiment, the duplex controller 4 may receive synchronization data from data stored in the memory database 8 to transmit them to another energy management server 10, thereby performing a synchronization.

The energy management server 10 may be in an enable state, and another energy management server 10 may be in a stand-by state.

The energy management server 10 is a system that manages and monitors a large scale energy, and it may be important to continuously operate the energy server 10. Accordingly, the energy management server 10 may include an enable state server and a standby server that is prepared in case that the enable state server is in trouble. This may be referred to a server duplexing.

The enable state server may perform an operation of the energy management server 10, and the standby server may synchronize the data processed in the enable server so that it may make a preparation for an abnormal state of the enable server. Also, since the standby server may synchronize the data processed in the enable server, when the enable server is in trouble, the standby server may receive operations without any separate synchronization process to operate an energy management system.

The duplex controller 4 may receive from the controller 2 a first data inputted from the power system in real time, and select dynamic data among data stored in the memory database 8 to receive them.

That is, the controller 2 may transmit the first data inputted from the power system to the duplex controller 4 in an inputted form.

The duplex controller 4 may receive the first data, and may receive from the memory database 8 data selected according to a user input among data changing every moment when the power system changes.

That is, the duplex controller 4 may receive the first and second data to perform a data consistency.

The data converted in real time such as voltage, current, power and load in the power system may be dynamic data, and the data when initially designing the power system and the data maintained until a user controls an input value may be static data.

That is, the dynamic data may be data converted in real time in the power system, and the static data may be data that are constantly remained in the power system unless they are changed by a user input or by a system change.

When the memory database 8 receives the processed second data, it may separately store dynamic data changing at a predetermined period in the power system and static data determined when designing the power system.

The duplex controller 4 may receive the first data in real time, and selectively receive any one of the dynamic data and the static data from the memory database 8. When the first data includes specific event data, the duplex controller 4 may synchronize the first data including the specific event data with another energy management server 10 in real time.

The duplex controller 4 may input a specific event according to a user input, that is, a user may control a changing data value among the static data with specific event data to input it. The duplex controller 4 may receive specific event data from the controller 2 to synchronize them with another energy management server 10. At this time, the duplex controller 4 may synchronize the changing static data and the dynamic data selected and received from the memory database 8 with another energy management server 10.

Accordingly, another energy management server 10 may reliably duplex the dynamic data changed in real time and the static data that are changed only by a user input without any data loss when a duplexing is needed, and rapidly duplex them.

Especially, it is important that data such as specific event data or data changing in real time in the power system are reflected in real time. Such data are directly transmitted from the controller 2 to the duplex controller 4 in real time without through the memory database 8 to duplex another energy management server 10, so that there is an operational effect of increasing a reliability when embodying a duplex management server.

Figure 2:
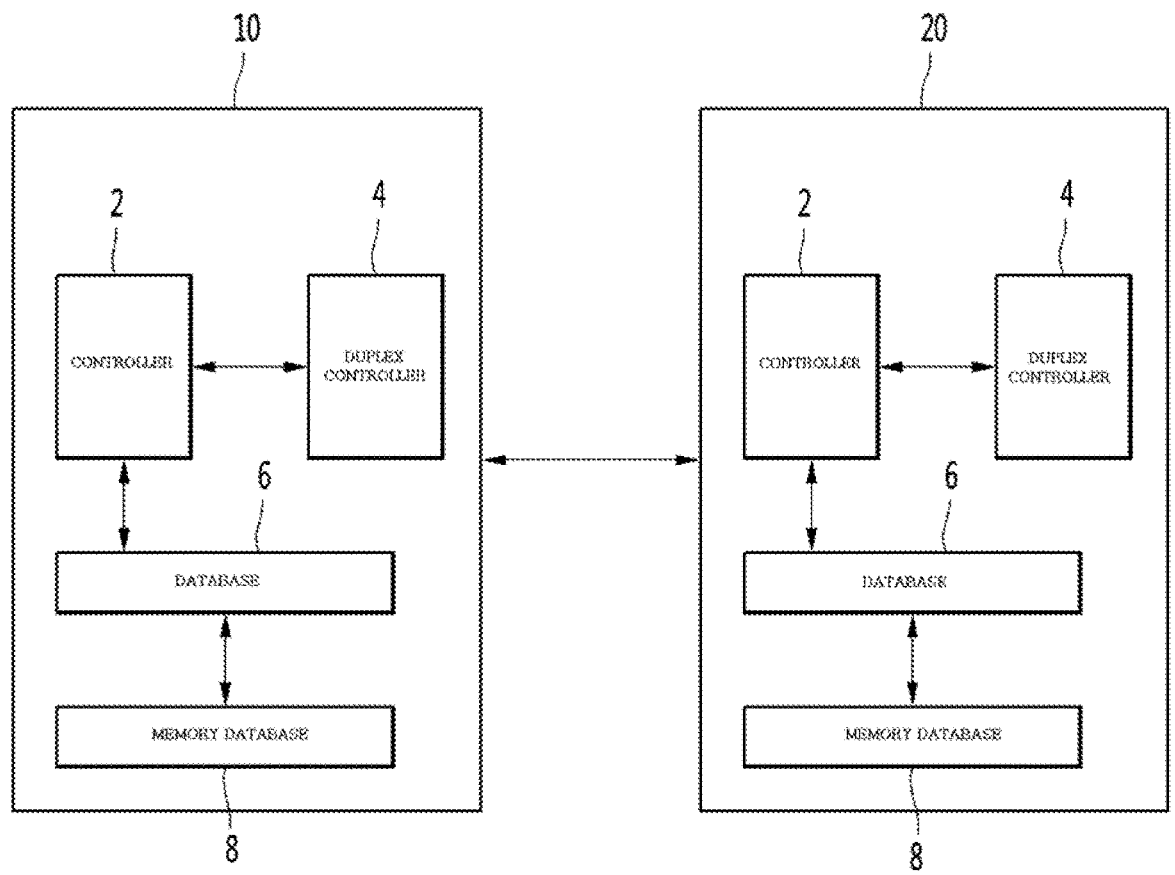
FIG. 2 is a block configuration view illustrating an energy management system to which an embodiment of the present disclosure is applied.

FIG. 2 is a block configuration view illustrating an energy management system to which an embodiment of the present disclosure is applied.

Referring to FIGS. 1 and 2, an energy management system to which an embodiment of the present disclosure is applied may include a first energy management server 10 and a second energy management server 20.

The energy management server 10 may be the first energy management server 10, and another energy management server 10 may be the second energy management server 20.

The second energy management server 20 may be the same configuration as the first energy management server 10. Also, the second energy management server 20 may instead perform an energy management performed by the first energy management server 10 when the first energy management server 10 cannot operate due to error and accident.

The first energy management server 10 may be in an enable state, and the second energy management server 20 may be in a standby state.

The first energy management server 10 may generate a database 6 with first data collected from the power system and second data produced by processing the first data.

The second energy management server 20 may synchronize the first and second data in the first energy management server 10.

The first energy management server 10 may include a duplex controller 4, and the duplex controller 4 may receive the first data in real time and transmit it to the second energy management server 20 in real time for synchronization. Also, the duplex controller 4 may selectively transmit data to be transmitted to synchronize with the second energy management server 20 among the second data stored in the database 6.

That is, the first energy management server 10 may receive data such as voltage, current, power that are power system field data from the power system as first data, and the first energy management server 10 may generate the database 6 with the second data produced by processing the first data.

That is, the duplex controller 4 may receive the first and second data to perform a data consistency.

The duplex controller 4 of the first energy management server 10 may select and receive the only data to synchronize with the second energy management server among the second data from the database 6, duplexing the second energy management server 20 together with the first data inputted in real time.

The first data inputted from the power system may be dynamic data periodically changing in the power system and static data determined according to a power system design.

The dynamic data may be data changing in real time such as voltage, current, phase value and period, and the static data may be system specific data that are determined when the power system is designed or data that are changed by a user according to a design change of the power system. That is, when the power system is initially designed and there is no specific change in a power system 30 design, the static data may be a constant value without being changed in real time. While the static data may be a constant value, however, it may be changed when a user requests a change by a specific event or the like to transmit specific event data.

The first energy management server 10 may include a memory database 8 that receives the second data processed from the database 6 and separates the second data into dynamic data and static data to store therein.

When the first energy management server 10 processes the first data and generates the database 6 with the second data, the memory database 8 may separate the second data into dynamic data and static data to store them.

The duplex controller 4 may select and transmit the static data of the second data based on a synchronization target item to select data to be transmitted to the second energy management server 20 from the memory database 8.

That is, when a user inputs the synchronization target item among the second data to duplex the second energy management server 20, the duplex controller 4 may select data based on the synchronization target item. Preferably, the duplex controller 4 may know the dynamic data and static data of the power system by the first data inputted in real time, and guarantee stability of the data of the power system changing in real time by the dynamic data selected among the second data by the synchronization target item.

The duplex controller 4 may select and receive dynamic data of the first and second data transmitted in real time to synchronize with the second energy management server 20.

When the first data include specific event data, the duplex controller 4 may synchronize the first data including the specific event data with the second energy management server 20.

The second energy management server 20 may receive the first data to synchronize the data corresponding to the power system in real time.

When a user generates a specific event and the first energy management server 10 receives specific event data, the duplex controller 4 may transmit the first data to the second energy management server 20 in real time to make a duplexing, and receive the dynamic data of the power system needed when making the duplexing from the memory database 8. By doing this, the energy management system may rapidly duplex the specific event and duplex the dynamic data changing in real time in the power system at the specific event, too. Accordingly, it may be possible to increase reliability of the energy management system. Also, the user may generate specific event data as response data for an accident of the power system. Also, the user may generate specific event data for a changed design of the power system.

Figure 3:
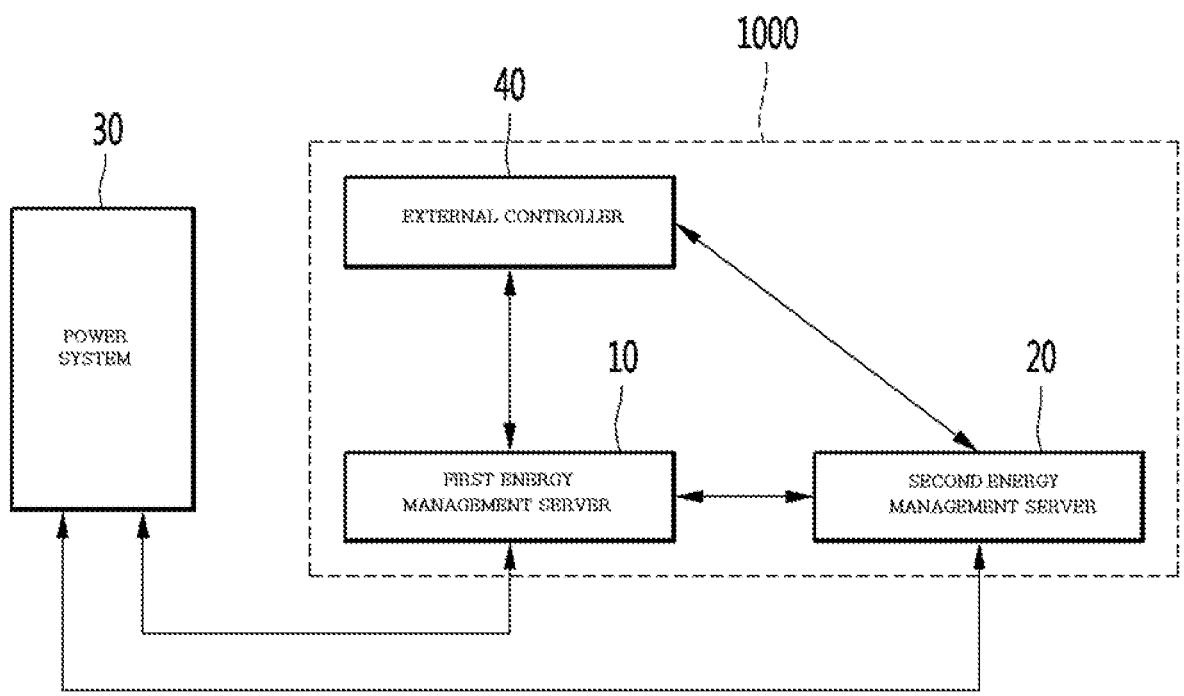
FIG. 3 is a block configuration view illustrating a supervisory remote control to which an embodiment of the present disclosure is applied.

FIG. 3 is a block configuration view illustrating a supervisory remote control to which an embodiment of the present disclosure is applied.

Referring to FIGS. 1 to 3, a supervisory control and data acquisition system SCADA to which an embodiment of the present disclosure is applied may include an external controller 40, a first energy management server 10 and a second energy management server 20.

A first energy management server 10 of the supervisory control and data acquisition system 1000 may receive field data from the power system.

The supervisory control and data acquisition system 1000 may use a shared memory area of a server as the database 6, calculate data obtained from devices such as RTU and ICCP, and process data to store them in the shared memory area.

At this time, since the supervisory control and data acquisition system 1000 has to use the second energy management server 20 that is a standby server when there occurs a trouble in the first energy management server 10 that is an active server, it may be possible to duplex the field data inputted from the power system from the first energy management server 10 to the second energy management server 20, thereby obtaining stability and reliability of the power system.

The field data inputted from the power system 30 may be analog data and discreet data, wherein the analog data may be data to express real numbers and the discrete data may be data to express 0 or 1.

The first energy management server 10 may process the analog data and discrete data, both being the field data, to store them in the memory database 8.

The external controller 40 may transmit specific event data to the first energy management server 10 or the second energy management server 20 when the specific event data occurs.

When there occurs a trouble in the first energy management server 10 so that the second energy management server 20 has to manage energy, the external controller 40 may transmit the specific event data to convert the state of the second energy management server 20 from a standby state into an enable state, and the state of the first energy management server 10 from an enable state into a standby state.

When there occurs a trouble in the first energy management server 10, the external controller 40 may transmit specific event data to solve the problem of the first energy management server 10.

When the second energy management server 20 receives the field data of the power system or specific event data of the external controller 40 from the first energy management server 10, it may synchronize them in real time.

Further, the second energy management server 20 may store the synchronized data in the memory database 8.

Figure 4:
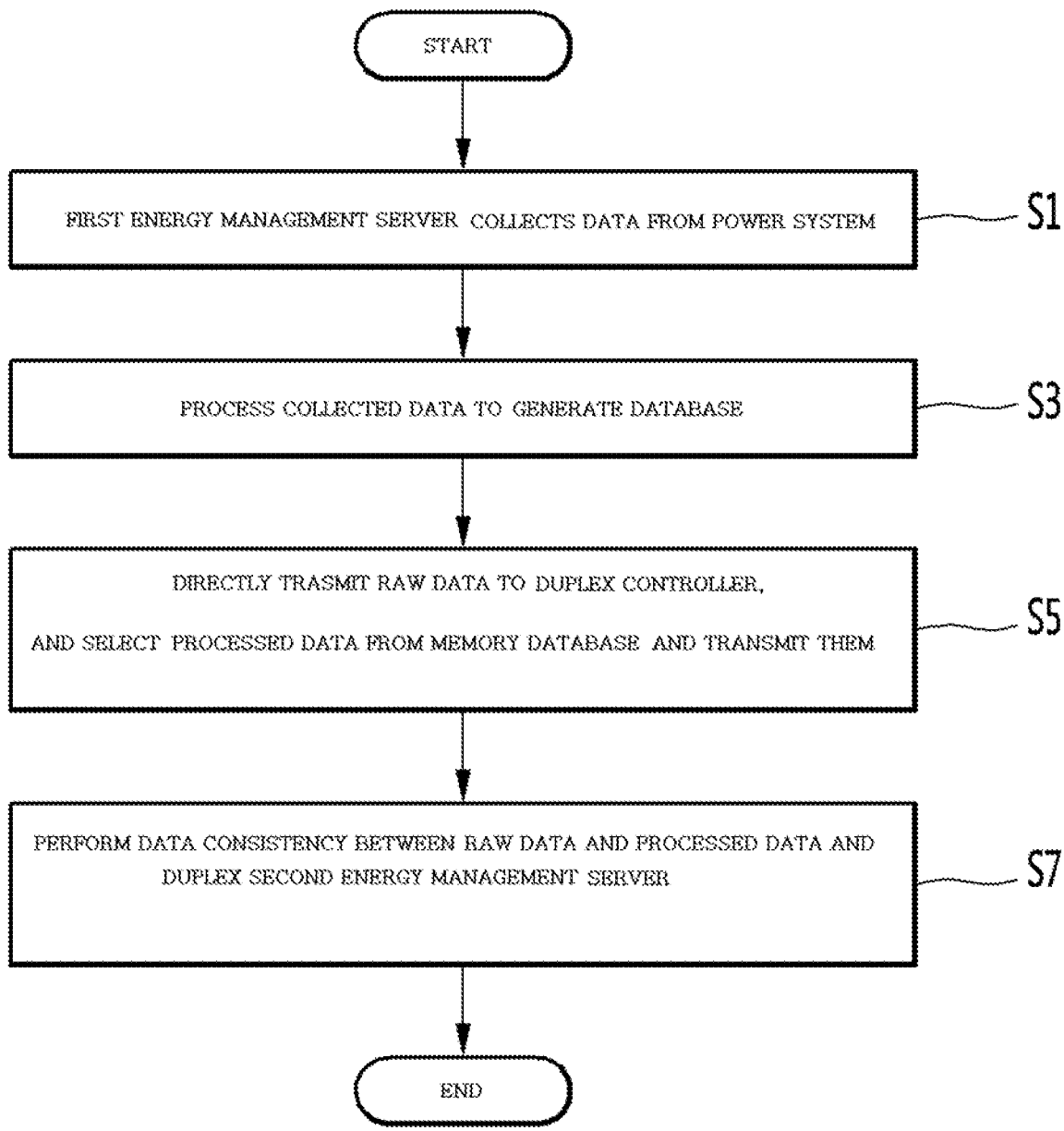
FIG. 4 is a flowchart illustrating an energy management system to which an embodiment of the present disclosure is applied.

FIG. 4 is a flowchart illustrating an energy management system to which an embodiment of the present disclosure is applied.

Referring to FIGS. 1 to 4, the first energy management server 10 may be in an enable state, collect data from the power system 30 (S1). Here, a raw data in the collected data may be first data, and the processed data may be second data.

The first energy management server 10 may process the collected data to generate the database 6 (S3). That is, the first energy management server 10 may generate the database 6 with the second data that are the processed data.

The first energy management server 10 may directly transmit the first data that are the raw data to the duplex controller 4 in real time. Also, the second data that are the processed data may be stored in the memory database 8, and the duplex controller 4 may select data needed to make duplexing among the second data stored in the memory database 8 to receive them (S5).

The duplex controller 4 may perform data consistency through data selected as data needed to make duplexing among the first data and the second data, and the second energy management server 20 may receive the first data that are raw data in real time, and receive data selected among the second data needed to perform the consistency to make duplexing (S7).

The above descriptions are only examples of the technical spirit of the present invention, so a person skilled in the art may implement various modifications and variations without departing from the spirit and scope of the present invention.

What is claimed is:

1. An energy management server, comprising:
a controller configured to process first data collected from a power system into second data when the energy management server is in an enable state, wherein the first data includes dynamic data and static data;
a memory database unit configured to classify the second data into dynamic data and static data according to an established data classification to store the classified dynamic and the classified static data; and
a duplex controller configured to selectively receive the first data and the classified dynamic data or the classified static data to synchronize with another energy management server,
wherein the controller is configured to convert from the enable state into a standby state when the controller receives specific event data transmitted from an external controller, and
wherein the duplex controller is configured to receive data transmitted from the another energy management server in the standby state, and perform synchronization of the data,
wherein the dynamic data includes at least one of voltage, current, a phase value, a period, power and a load, and is converted in real time in the power system,
wherein the static data is constantly remained in the power system unless the static data is changed by a user input,
wherein the duplex controller synchronizes the static data included in the first data with the another energy management server in real time when the static data included in the first data includes the specific event data, wherein the static data including the specific event data has a changing data value among the static data according to the user input,
wherein the duplex controller selects the classified dynamic data among data stored in the memory database unit and synchronizes the classified dynamic data with the another energy management server,
wherein the controller is configured to transmit directly the static data including the specific event data to the duplex controller in real time without going through the memory database unit,
wherein the memory database unit classifies and stores the dynamic data changing at an interval of a predetermined period in the power system, and the static data determined when designing the power system, among the second data.

2. The energy management server of claim 1, further comprising a database configured to store at least the first or second data.

3. An energy management system, comprising:
a first energy management server; and
a second energy management server configured to process first data collected from a power system into second data, and selectively synchronize with the first energy management server dynamic data or static data produced by classifying the first data and the second data according to an established data classification,
wherein the second energy management server includes:
a controller configured to process the first data into the second data when the energy management server is in an enable state, wherein the first data includes dynamic data and static data;
a memory database unit configured to classify the second data into the dynamic data and the static data according to the established data classification to store the classified dynamic and the classified static data; and
a duplex controller configured to selectively receive the first data and the classified dynamic data or the classified static data to synchronize with the first energy management server,
wherein the controller is configured to convert from the enable state into a standby state when the controller receives specific event data transmitted from an external controller, and
wherein the duplex controller is configured to receive data transmitted from the first energy management server in the standby state, and perform synchronization of the data,
wherein the dynamic data includes at least one of voltage, current, a phase value, a period, power and a load, and is converted in real time in the power system,
wherein the static data is constantly remained in the power system unless the static data is changed by a user input,
wherein the duplex controller synchronizes the static data included in the first data with the first energy management server in real time when the static data included in the first data includes the specific event data, wherein the static data included in the specific event data has a changing data value among the static data according to the user input,
wherein the duplex controller selects the classified dynamic data among data stored in the memory database unit and synchronizes the classified dynamic data with the first energy management server,
wherein the controller is configured to transmit directly the static data including the specific event data to the duplex controller in real time without going through the memory database unit,
wherein the memory database unit classifies and stores the dynamic data changing at an interval of a predetermined period in the power system, and the static data determined when designing the power system, among the second data.

4. The energy management system of claim 3, wherein the duplex controller receives the dynamic data stored in the memory database unit.

5. The energy management system of claim 3, further comprising a database configured to store at least one of the first and second data.

6. The energy management system of claim 3, wherein the first energy management server includes a construction corresponding to the duplex controller included in the second energy management server.

7. The energy management system of claim 3, further comprising the external controller that converts operation states of the first and second energy management servers,
wherein the external controller controls the first energy management server to operate in the enable state, when a fault occurs in the second energy management server.

8. A method for operating an energy management system, comprising:
receiving first data collected from a power system, wherein the first data includes dynamic data and static data;
allowing a second energy management server in an enable state to process first data collected from a power system into second data;
allowing the second energy management server to classify the second data into dynamic data and static data according to an established data classification;
storing the classified dynamic data and the classified static data in a memory database unit;
selectively synchronizing the first data and the classified dynamic data or the classified static data with the first energy management server,
converting from the enable state into a standby state when the energy management system receives specific event data transmitted from an external controller;
receiving data transmitted from the first energy management server in a standby state; and
synchronizing the data with the first energy management server,
wherein the dynamic data includes at least one of voltage, current, a phase value, a period, power and a load, and is converted in real time in the power system,
wherein the static data is constantly remained in the power system unless the static data is changed by a user input,
wherein the synchronizing the first data and the classified dynamic data or the classified static data with the first energy management server comprises:
transmitting directly the static data including a specific event data in real time without going through the memory database unit;
synchronizing the static data included in the first data with the first energy management server in real time when the static data included in the first data includes the specific event data, wherein the static data included in the specific event data has a changing data value among the static data according to the user input; and
selecting the classified dynamic data among data stored in the memory database unit and synchronizing the classified dynamic data with the another energy management server,
wherein the memory database unit classifies and stores the dynamic data changing at an interval of a predetermined period in the power system, and the static data determined when designing the power system, among the second data.

9. The method of claim 8, further comprising:
determining whether a fault occurs in the second energy management server; and
transferring a fault occurrence to the external controller when a fault occurs in the second energy management server.

* * * * *